US009013267B2

(12) United States Patent
Curtis et al.

(10) Patent No.: US 9,013,267 B2
(45) Date of Patent: Apr. 21, 2015

(54) SYSTEMS AND METHODS FOR POSITION-BASED LOANING OF ELECTRONIC DOCUMENTS TO ELECTRONIC DEVICE USERS

(75) Inventors: Scott Curtis, Durham, NC (US); Kunal Kandekar, Jersey City, NJ (US)

(73) Assignee: Rhonda Enterprises, LLC, Wilmington, DE (US)

( * ) Notice: Subject to any disclaimer, the term of this patent is extended or adjusted under 35 U.S.C. 154(b) by 829 days.

(21) Appl. No.: 13/215,507

(22) Filed: Aug. 23, 2011

(65) Prior Publication Data

US 2012/0050004 A1 Mar. 1, 2012

Related U.S. Application Data

(60) Provisional application No. 61/376,321, filed on Aug. 24, 2010.

(51) Int. Cl.
G06F 7/04 (2006.01)
G06Q 99/00 (2006.01)
G06F 15/16 (2006.01)
H04W 4/20 (2009.01)
G06Q 30/02 (2012.01)
H04W 4/02 (2009.01)

(52) U.S. Cl.
CPC ........... H04W 4/206 (2013.01); G06Q 30/0214 (2013.01); H04W 4/023 (2013.01)

(58) Field of Classification Search
CPC ........................................................ G06F 7/04

USPC ........................ 340/5.2, 539.32, 572.1, 686.6; 455/41.3, 456, 414, 266; 709/206, 217, 709/250; 726/1, 26
See application file for complete search history.

(56) References Cited

U.S. PATENT DOCUMENTS

| 5,455,851 | A | 10/1995 | Chaco et al. | |
|---|---|---|---|---|
| 6,333,753 | B1 | 12/2001 | Hinckley | |
| 6,618,593 | B1 * | 9/2003 | Drutman et al. | 455/456.3 |
| 6,771,213 | B2 | 8/2004 | Durst et al. | |
| 7,010,308 | B2 | 3/2006 | Hendrey | |
| 7,096,030 | B2 | 8/2006 | Huomo | |
| 7,174,031 | B2 | 2/2007 | Rhoads et al. | |

(Continued)

FOREIGN PATENT DOCUMENTS

EP 1054335 A2 11/2000

OTHER PUBLICATIONS

"Amazon Remembers," found at <http://www.amazon.com/gp/feature.html?ie=UTF8&docId=1000291661> on the Internet Archive, dated Mar. 2, 2010, copyright 1996-2010, Amazon.com, Inc. or its affiliates, printed Nov. 11, 2011, 2 pages.

(Continued)

Primary Examiner — Nam V Nguyen
(74) Attorney, Agent, or Firm — Olive Law Group, PLLC

(57) ABSTRACT

Systems and methods for position-based loaning of electronic documents to electronic device users are disclosed herein. According to an aspect, a method may include determining a position of an electronic device. The method may also include determining a registration status associated with the electronic device. Further, the method may include communicating a portion of an electronic document to the electronic device based on the position and the registration status.

25 Claims, 12 Drawing Sheets

(56) References Cited

U.S. PATENT DOCUMENTS

| | | | |
|---|---|---|---|
| 7,256,770 B2 | 8/2007 | Hinckley et al. | |
| 7,358,956 B2 | 4/2008 | Hinckley et al. | |
| 7,493,291 B2 | 2/2009 | Simelius | |
| 7,556,194 B2 | 7/2009 | Rogoyski | |
| 7,593,605 B2 | 9/2009 | King et al. | |
| 7,593,740 B2 * | 9/2009 | Crowley et al. | 455/456.3 |
| 7,602,382 B2 | 10/2009 | Hinckley et al. | |
| 7,671,756 B2 | 3/2010 | Herz et al. | |
| 7,702,728 B2 * | 4/2010 | Zaner et al. | 709/205 |
| 7,778,994 B2 | 8/2010 | Raman et al. | |
| 7,792,756 B2 | 9/2010 | Plastina et al. | |
| 7,860,923 B2 | 12/2010 | Singer et al. | |
| 7,959,086 B2 | 6/2011 | Mattlin et al. | |
| 8,050,623 B2 * | 11/2011 | Singer et al. | 455/41.2 |
| 8,285,811 B2 * | 10/2012 | Svendsen et al. | 709/217 |
| 8,508,363 B2 * | 8/2013 | Raniere | 340/539.32 |
| 8,654,952 B2 * | 2/2014 | Wang et al. | 379/202.01 |
| 8,655,960 B2 * | 2/2014 | Lewis et al. | 709/206 |
| 2002/0122055 A1 | 9/2002 | Parupudi et al. | |
| 2002/0196291 A1 | 12/2002 | Komsi et al. | |
| 2004/0009750 A1 | 1/2004 | Beros et al. | |
| 2005/0138576 A1 | 6/2005 | Baumert et al. | |
| 2005/0160270 A1 | 7/2005 | Goldberg et al. | |
| 2006/0099967 A1 | 5/2006 | Colvin et al. | |
| 2006/0148560 A1 | 7/2006 | Arezina et al. | |
| 2006/0179452 A1 | 8/2006 | Amodeo et al. | |
| 2007/0101433 A1 | 5/2007 | Louch et al. | |
| 2007/0124965 A1 | 6/2007 | McMurtry et al. | |
| 2007/0162971 A1 | 7/2007 | Blom et al. | |
| 2007/0255580 A1 | 11/2007 | Cole et al. | |
| 2007/0281690 A1 | 12/2007 | Altman et al. | |
| 2007/0299681 A1 | 12/2007 | Plastina et al. | |
| 2008/0009272 A1 * | 1/2008 | Toledano | 455/414.1 |
| 2008/0039203 A1 | 2/2008 | Ackley et al. | |
| 2008/0068627 A1 | 3/2008 | Hart et al. | |
| 2008/0132251 A1 | 6/2008 | Altman et al. | |
| 2008/0162291 A1 | 7/2008 | Schuler et al. | |
| 2008/0182591 A1 | 7/2008 | Krikorian | |
| 2008/0222711 A1 | 9/2008 | Michaelis | |
| 2008/0300985 A1 | 12/2008 | Shamp et al. | |
| 2008/0319773 A1 | 12/2008 | Wong et al. | |
| 2009/0006304 A1 | 1/2009 | Ma et al. | |
| 2009/0031258 A1 | 1/2009 | Arrasvuori et al. | |
| 2009/0191898 A1 | 7/2009 | Lewis et al. | |
| 2009/0247197 A1 | 10/2009 | Graff et al. | |
| 2010/0045816 A1 | 2/2010 | Rhoads | |
| 2010/0058185 A1 | 3/2010 | Commarford et al. | |
| 2010/0063889 A1 | 3/2010 | Proctor, Jr. et al. | |
| 2010/0077017 A1 | 3/2010 | Martinez et al. | |
| 2010/0110011 A1 * | 5/2010 | Milne et al. | 345/169 |
| 2010/0121921 A1 | 5/2010 | Dunton | |
| 2010/0146115 A1 * | 6/2010 | Bezos | 709/225 |
| 2010/0198675 A1 | 8/2010 | Möckli | |
| 2010/0306122 A1 * | 12/2010 | Shaffer | 705/319 |
| 2011/0302009 A1 * | 12/2011 | Freed et al. | 705/14.16 |
| 2012/0054011 A1 | 3/2012 | Petersen et al. | |

OTHER PUBLICATIONS

"Amazon.com Associates: The web's most popular and successful Affiliate Program," found at <https://affiliate-program.amazon.com/> on the Internet Archive, dated Jul. 10, 2010, copyright 1996-2010, Amazon.com, Inc., printed Nov. 11, 2011, 3 pages.

"Barcode Management & Infrastructure | NeoMedia," found at <http://neom.com/solutions/barcodemgmt> on the Internet Archive, dated Jul. 29, 2010, copyright 2010, Neomedia, printed Nov. 11, 2011, 1 page.

Churchill, Sam, "Near Field Payment Coming to USA," posted Nov. 16, 2010, found at <http://www.dailywireless.org/2010/11/16/near-field-payment-coming-to-usa/>, printed Jul. 13, 2011, 10 pages.

Clark, Sarah, "Ideo concept shows how RFID tags could be used in the music industry," dated Feb. 26, 2011, found at <http://www.nfcworld.com/2011/02/26/36143/ideo-rfid-music-mixtape/>, copyright 2008-2011, SJB Research, printed Jul. 13, 2011, 3 pages.

Dey, Anind K. and Abowd, Gregory D., "Towards a Better Understanding of Context and Context-Awareness," In HUC '99: Proceedings of the 1st international symposium on Handheld and Ubiquitous Computing, 1999, article also published in GVU Technical Report, GIT-GVU-99-22, 1999, Georgia Institute of Technology, Atlanta, Georgia, found at <http://smartech.gatech.edu/bitstream/handle/1853/3389/99-22.pdf?sequence=1>, 12 pages.

Hollister, Sean, "Google rolls out NFC-equipped Places business kits, muscles in on location-based territory in Portland," posted Dec. 10, 2010, found at <http://www.engadget.com/2010/12/10/google-rolls-out-nfc-equipped-places-business-kits-muscles-in-o/>, copyright 2011, AOL Inc., printed Jul. 13, 2011, 7 pages.

MJD, "Google's NFC Is Another Sign The Proximity Network Is Coming," posted May 11, 2011, Media Junction Digital, found at <http://millionmedia.wordpress.com/2011/05/11/googles-nfc-is-another-sign-the-proximity-network-is-coming/>, printed Jul. 14, 2011, 1 page.

"NeoReader: FAQ," found at <http://www.neoreader.com/44.html> on the Internet Archive, dated May 12, 2010, printed Nov. 11, 2011, 1 page.

Oliver, Sam, "Apple's next-gen iPhone rumored with RFID-enabled 'remote computing'," dated Nov. 1, 2010, found at <http://www.appleinsider.com/articles/10/11/01/apples_next_gen_iphone_rumored_with_rfid_enabled_remote_computing.html>, copyright 1997-2010, AppleInsider, printed Jul. 13, 2011, 3 pages.

Purcell, Kevin, "Google Music Beta Announced by Invite Only for Now (video)," posted May 10, 2011, GottaBeMobile, found at <http://www.gottabemobile.com/2011/05/10/google-music-beta-announced-by-invite-only-for-now/#0_undefined,0>, copyright 2011, Notebooks.com Inc., printed Oct. 25, 2011, 4 pages.

Schonfeld, Erick, "See That Funny 2D Barcode In The Store Window? It Might Pull Up A Google Listing," dated Dec. 6, 2009, found at <http://techcrunch.com/2009/12/06/google-local-maps-qr-code/>, copyright 2011, AOL Inc., printed Jul. 13, 2011, 3 pages.

Toto, Serkan, "Via NFC: Japanese Social Network Mixi First To Let Users "Share" Real-World Items," dated Feb. 11, 2011, found at <http://techcrunch.com/2011/02/11/via-nfc-japanese-social-network-mixi-first-to-let-users-like-real-world-items/>, copyright 2011, AOL Inc., printed Jul. 13, 2011, 3 pages.

Van Woensel, W. et al., "A Framework for Decentralized, Context-Aware Mobile Applications Using Semantic Web technology," Proceedings of the Confederated International Workshops and Posters on On the Move to Meaningful Internet Systems: ADI, CAMS, EI2N, ISDE, IWSSA, MONET, OnToContent, ODIS, ORM, OTM Academy, SWWS, SEMELS, Beyond SAWSDL, and COMBEK 2009, Nov. 1-6, 2009, Vilamoura, Portugal, found at <http://wise.vub.ac.be/downloads/Papers/CAMS2009.pdf>, 10 pages.

* cited by examiner

SYSTEMS AND METHODS FOR POSITION-BASED LOANING OF ELECTRONIC DOCUMENTS TO ELECTRONIC DEVICE USERS

CROSS REFERENCE TO RELATED APPLICATION

This application claims the benefit of U.S. provisional patent application No. 61/376,321, filed Aug. 24, 2010, the content of which is hereby incorporated herein by reference in its entirety.

TECHNICAL FIELD

The present disclosure relates to systems and methods for providing electronic documents to electronic device users.

BACKGROUND

Electronic books, or e-books, are text and image-based publications in digital form produced on, published by, and readable on computers or other electronic devices. E-books are often read on dedicated hardware devices, such as e-book readers or e-book devices. Personal computers, mobile devices, such as smart phones and tablet computers, and other suitable devices may also be used for reading e-books.

Readers of printed books, magazines, newspapers, or other print material are accustomed to the practice of sharing or loaning such reading material to their friends, family, and colleagues. Many e-readers and other electronic devices are not configured to or capable of easily allowing a user to share his or her electronic documents with other electronic device users. Accordingly, it is desirable to provide techniques for improving users' ability to share electronic document content with other electronic device users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for position-based loaning of electronic documents to electronic device users. According to an aspect, a method includes determining a position of an electronic device. For example, an e-book reader may determine that another e-book reader is positioned within a predetermined distance. The method also includes determining a registration status associated with the electronic device. For example, the e-book reader may determine whether the other e-book reader is registered with a social network service. Further, the method includes communicating a portion of an electronic document to the electronic device based on the position and the registration status. For example, the e-book reader may communicate a selected portion of an e-book to the other e-book reader. The e-book portion may only be communicated if the other e-book reader is positioned within the predetermined distance and a user of the other e-book reader is registered with the social network service.

According to another aspect, a method may include receiving a portion of an electronic document. For example, an e-book reader may receive a portion of an e-book from another e-book reader for purpose of loan. The method also includes receiving information restricting use of the portion of the electronic document based on a position of the first electronic device with respect to a position of a second electronic device. For example, the e-book reader may present the e-book portion only when within a predetermined distance of the loaning e-book reader. Further, the method includes controlling use of the portion of the electronic document based on the received information. The e-book reader may control presentation of the e-book portion based on the information restricting the use.

According to another aspect, a method includes receiving from a first electronic device a user identifier, identification of an electronic document, and an indicator that indicates that a portion of the electronic document has been communicated to a second electronic device associated with the user identifier. For example, an e-book reader may communicate such information to an online retailer server via a network. The method also includes applying a referral credit to an account associated with the first electronic device based on the indicator. For example, the online retailer server may apply a referral credit to a retail account of a user of the e-book reader.

According to yet another aspect, a method includes receiving from a first electronic device an identifier associated with a second electronic device. For example, a server may receive such an identifier from an e-book reader. The method also includes determining that the first electronic device and the second electronic device are within a predetermined distance of one another. For example, the server may receive position coordinates of the e-book reader and another e-book reader for determining whether the e-book readers are within a predetermined distance of one another. The method also includes communicating a portion of an electronic document to the second electronic device in response to determining that the first electronic device and the second electronic device are within the predetermined distance of one another.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION

Figure 1:
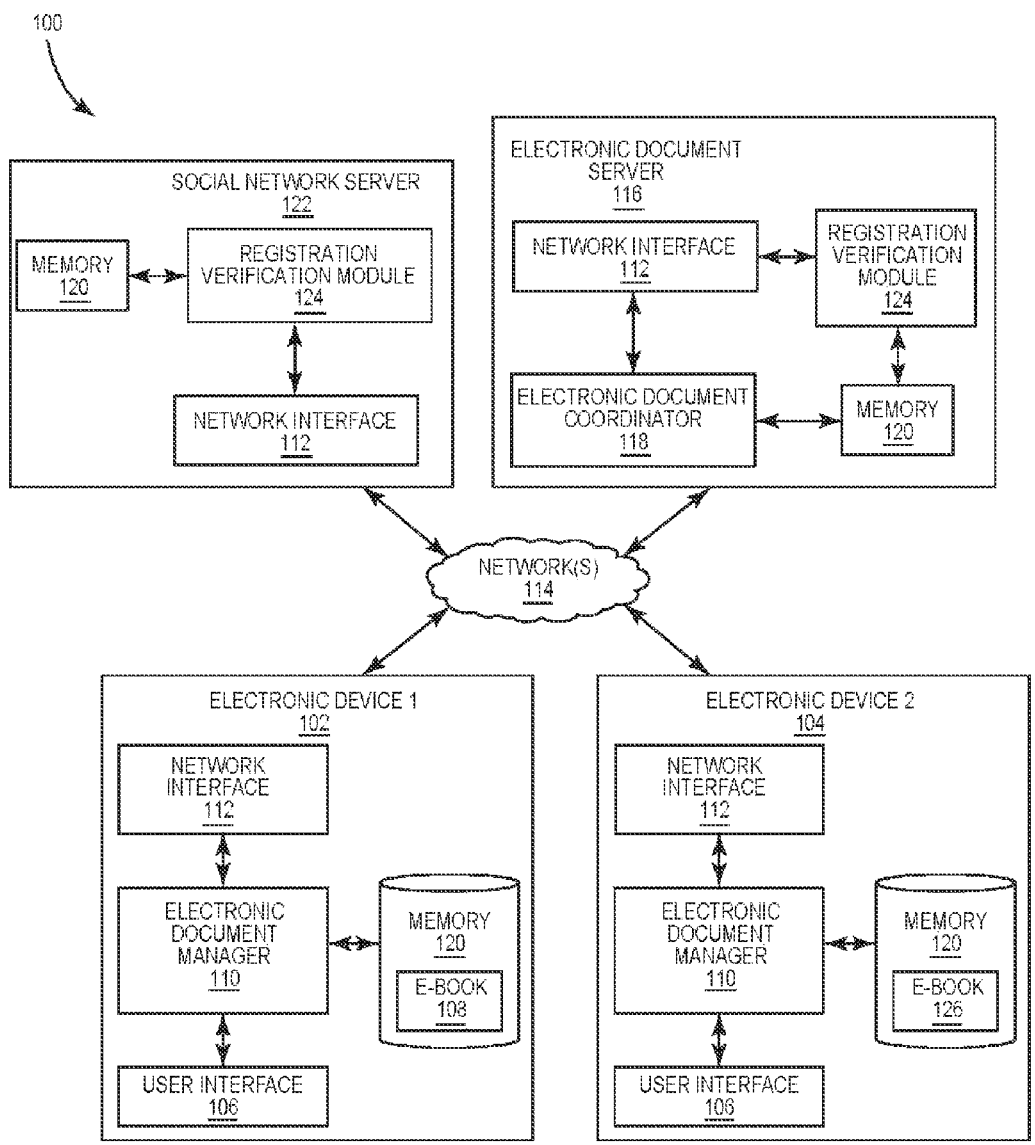
FIG. 1 is a schematic diagram of a system for position-based loaning of electronic documents to electronic device users in accordance with embodiments of the present disclosure.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Embodiments of the present disclosure enable an electronic device, such as an e-book reader, to determine a position of another electronic device, to determine a registration status associated with the other electronic device, and to communicate a portion or all of an electronic document to the other electronic device based on the position and the registration status. For example, an e-book reader may be displaying a page of an electronic document, such as an e-book, to its user. The user may interface with the e-book reader to initiate loaning or sharing the electronic document with an e-book reader of another user. In response to this user interface, the e-book reader may attempt to establish a wireless communication connection with the other e-book reader if a wireless communication connection is not already established. The e-book reader may then determine whether the other e-book reader is within a predetermined distance. For example, the e-book reader may estimate a distance between the two e-book readers based on a signal strength of the wireless communication connection. In addition, the e-book reader may determine, for example, whether a user identifier associated with the other e-book reader is registered with either a social network or an electronic document provider. For example, the e-book reader may receive a username and password from the other e-book reader for use in verifying with a remote server that the other e-book reader is registered with either the social network or the electronic document provider. In response to verifying registration and that the other e-book reader is within the predetermined distance, the e-book reader may wirelessly communicate a portion or all of the e-book to the other electronic device. For example, the e-book reader may communicate a copy of the page that is currently being displayed by use of a wireless communication connection with the other e-book reader. The recipient e-book reader may be restricted to presenting the page to the user only when the e-book reader is within the predetermined distance. In this way, a portion of the e-book may be shared with another user with a restriction being that the portion may only be presented while the recipient e-book reader is within a predetermined distance of the sender e-book reader.

As referred to herein, the term "electronic device" should be broadly construed. It can include any type of device capable of presenting an electronic document to a user. For example, the electronic device may be an e-book reader configured to present an e-book to a user. Example e-book readers include, but are not limited to, the KINDLE® and NOOK® e-book readers. In another example, an electronic device may be a mobile device such as, for example, but not limited to, a smart phone, a cell phone, a pager, a personal digital assistant (PDA, e.g., with GPRS NIC), a mobile computer with a smart phone client, or the like. An electronic device can also include any type of conventional computer, for example, a desktop computer or a laptop computer. A typical mobile device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of mobile wireless devices. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on an e-book reader, the examples may similarly be implemented on any suitable electronic device, such as a computer or smart phone.

As referred to herein, the term "electronic document" should be broadly construed. Example electronic documents can be presented and stored in the form of book pages that may be browsed using an electronic device such as, for example, an e-book reader or tablet computer. An electronic document may be stored in any suitable format, such as, but not limited to, portable document format (PDF), hypertext markup language (HTML), extensible markup language (XML), EPUB, or any suitable e-book or word processing format. It is also noted that an e-book is an example of an electronic document. Further, it is noted that when the term "electronic document" is recited herein, the term may also be substituted with the term "e-book" or any other electronic document example disclosed herein, and vice versa.

As referred to herein, a "user interface" is generally a system by which users interact with an electronic device. An interface can include an input for allowing users to manipulate an electronic device, and can include an output for allowing the system to present information (e.g., electronic text) and/or data, indicate the effects of the user's manipulation, etc. An example of an interface on an electronic device includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display object can be displayed on a display screen of an electronic device and can be selected by, and interacted with by, a user using the interface. In an example, the display of the electronic device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or arrow keys for moving a cursor to highlight and select the display object.

Operating environments in which embodiments of the present disclosure may be implemented are also well-known. In a representative embodiment, a mobile electronic device, such as an e-book reader, is connectable (for example, via WAP) to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage within a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, embodiments in accordance with the present disclosure may be implemented in other and next-generation mobile networks and devices as well. The mobile device is the physical equipment used by the end user, typically a subscriber to the wireless network. Typically, a mobile device is a 2.5G-compliant device, 3G-compliant device, or 4G-compliant device that includes a subscriber identity module (SIM), which is a smart card that carries subscriber-specific information, mobile equipment (e.g., radio and associated signal processing devices), a user interface (or a man-machine interface (MMI)), and one or more interfaces to external devices (e.g., computers, PDAs, and the like). The electronic device may also include a memory or data store.

The presently disclosed subject matter is now described in more detail. For example, FIG. 1 illustrates a schematic diagram of a system 100 for position-based loaning of electronic documents to electronic device users in accordance with embodiments of the present disclosure. Referring to FIG. 1, the system 100 includes an electronic device 102 configured to loan all or a portion of an electronic document to another electronic device 104. In this example, electronic devices 102 and 104 are e-book readers, but may alternatively be any other suitable electronic device configured to present an electronic document to a user and to communicate with another electronic device. A user of the electronic device 102 may interact with a user interface 106 to select an e-book 108 and the electronic device 104 as an intended recipient of the e-book 108. In response to the selection, an electronic document manager 110 of the electronic device 102 may determine a position of the electronic device 104. For example, the electronic document manager 110 may determine whether the electronic device 104 is positioned within a predetermined distance of the electronic device 102. Alternatively, the electronic device 102 may check if device 104 is within a predetermined distance before allowing the user of device 102 to select device 104 as an intended recipient. Further, in response to the selection, the electronic document manager 110 may determine a registration status associated with the electronic device 104. For example, the electronic document manager 110 may determine whether a user identifier associated with the electronic device 104 is registered with one or both of a social network and an electronic document provider. In response to determining that the position of the electronic device 104 and the registration status meet predetermined criteria, the electronic document manager 110 may control a communications interface, such as a network interface 112, to communicate all or a portion of the e-book 108 to the electronic device 104 via one or more networks 114. The device 102 may also provide information applying restrictions on the use of the loaned portion of the e-book 108 by the device 104 using, for example, Digital Rights Management (DRM) methods. In this way, a user of the electronic device 102 may share content of the e-book 108 or any other electronic document with another electronic device. Loan of an electronic document may be restricted based on a position of the recipient electronic device and a registration status with a social network or an electronic document provider.

Figure 2A:
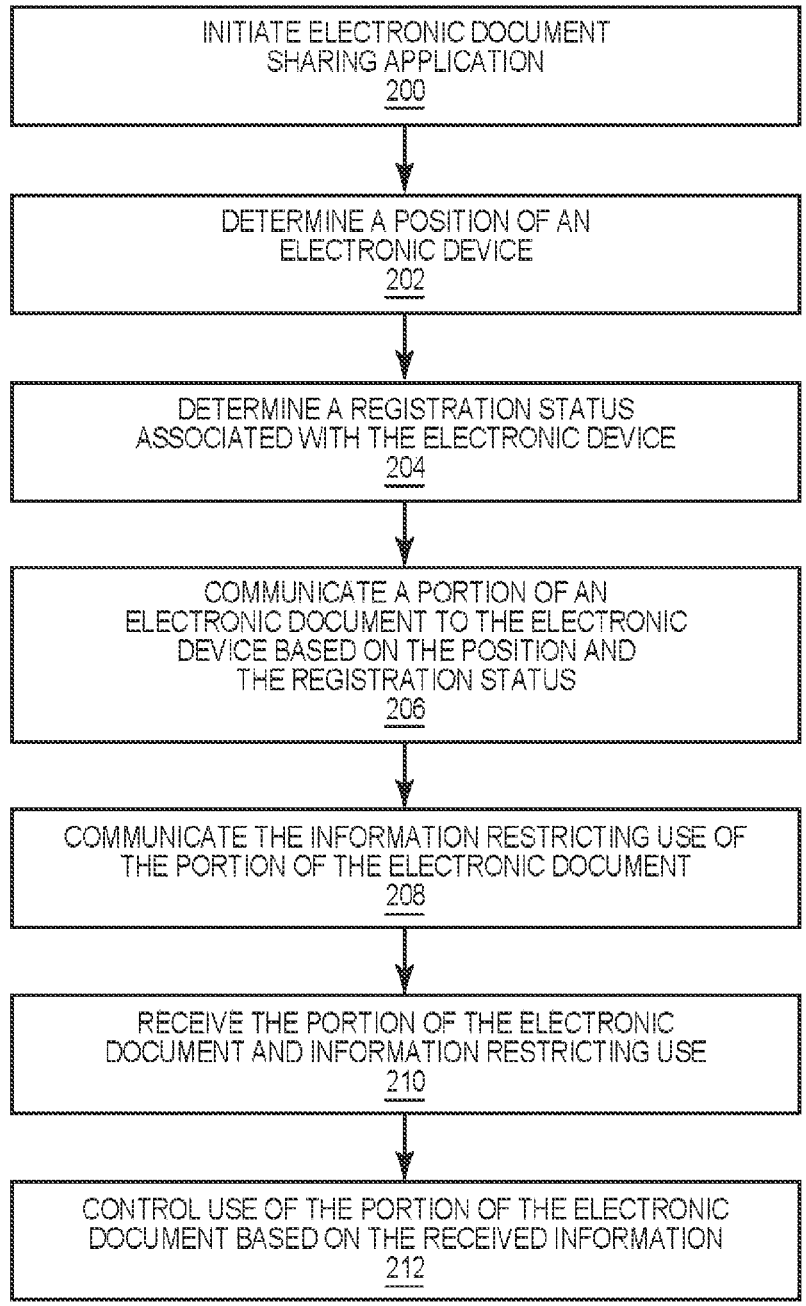
FIG. 2A is a flow chart of an exemplary method for position-based loaning of electronic documents to electronic device users in accordance with embodiments of the present disclosure.

In accordance with embodiments of the present disclosure, FIG. 2A illustrates a flow chart of an exemplary method for position-based loaning of electronic documents to electronic device users. The method of FIG. 2A is described with respect to the example system 100 shown in FIG. 1, although the method may be implemented by any suitable system or electronic device. Various steps of FIG. 2A may be implemented entirely, or in part, by an electronic document manager 110 residing on the electronic device 102 shown in FIG. 1. Various other steps of FIG. 2A may be implemented entirely, or in part, by the electronic document manager 110 residing on the electronic device 104. The electronic document managers 110 may each be implemented by software, hardware, firmware, or combinations thereof.

Referring to FIG. 2A, the method includes initiating an electronic document sharing application for selecting an electronic device and an e-book (step 200). For example, the application (often referred to as an "app") may reside on the electronic device 102 and may be used to allow the user to select an e-book, such as the e-book 108, to be shared with the electronic device 104. The application may reside on the electronic device 102 and be a part of the electronic document manager 110. The user may, for example, input commands into the user interface 106 for selecting the e-book 108 and for identifying the electronic device 104 and/or a user associated with the electronic device 104. The application may also be an e-book reader application, and the user of device 102 may choose to share a document that has already been selected for reading.

The method of FIG. 2A includes determining a position of an electronic device (step 202). For example, the electronic document manager 110 of the electronic device 102 may determine a position of the electronic device 104 with respect to the electronic device 102. In an embodiment, the electronic document manager 110 of the electronic device 102 may determine whether the electronic device 104 is within a predetermined distance from the electronic device 102. Communication of the selected electronic document, or a portion thereof, may be restricted to only those electronic devices that are within the predetermined distance.

In an embodiment, a position of another electronic device may be determined based on a wireless communication with the other electronic device. If wireless communication is established or the electronic devices are capable of wireless communication (e.g., within range of one another), it may be determined that the other electronic device is within the predetermined distance, and thus the other electronic device is a candidate for sharing an electronic document. For example, referring to FIG. 1, the electronic devices 102 and 104 may be in wireless communication by use of a suitable technique such as, but not limited to, a wireless local area network (WLAN) or wireless personal area network (WPAN) technology. The electronic document manager 110 of the electronic device 102 may be configured to monitor one or more wireless communication components of the electronic device 102 for determining whether the electronic device 102 is in wireless communication with the electronic device 104. The electronic document manager 110 may determine that the electronic device 104 is positioned within the predetermined distance of the electronic device 102.

In another embodiment, it may be determined that another electronic device is within a predetermined distance if the other electronic device is detectable over a wireless communication technology such as, but not limited to, BLUETOOTH®, WI-FI®, and the like. For example, the electronic document manager 110 of the electronic device 102 may be configured to monitor one or more wireless communication components of the electronic device 102 for determining whether the electronic device 104 is detectable over a wireless communication technology. The electronic device manager 110 may determine that the electronic device 104 is within the predetermined distance in response to determining that the electronic device 104 is detectable over the wireless communication technology. Such wireless communication technologies may have a limited range, thus it can be assumed that the other electronic device is nearby or within the predetermined distance if the other electronic device is detectable by such techniques.

In another embodiment, a position of another electronic device may be determined based on a signal quality of a wireless communication connection between electronic devices. For example, the electronic document manager 110 of the electronic device 102 may be configured to monitor one or more wireless communication components of the electronic device 102 for determining whether a signal quality of a wireless communication connection between the electronic device 102 and the electronic device 104 is greater than a predetermined signal quality level. The signal quality may be, for example, but not limited to, a signal strength quality of communications between the electronic device 102 and the electronic device 104. The signal strength may be determined based on, for example, a received signal strength indicator (RSSI), a receive power level, a link quality indicator (LQ), a signal to noise ratio (SNR), a packet reception rate (PRR), a bit error rate (BER), or the like. The electronic document manager 110 may use the RSSI to determine a distance between the electronic devices 102 and 104. If the RSSI is above a predetermined level, it may be determined that the other electronic device is a candidate for receipt of a selected electronic document. Otherwise, it may be determined that the other electronic device is not sufficiently close to qualify as a candidate for receipt of the selected electronic document. The electronic document manager 110 may determine that the electronic device 104 is within the predetermined distance in response to determining that the signal quality is greater than the predetermined signal quality level.

In yet another example, a suitable wireless technology, such as IEEE 802.15.4a, which includes a ranging protocol, may be used to determine a distance between electronic devices. The electronic document manager 110 may use the determined distance to determine whether the electronic devices are positioned less than a predetermined distance apart. In another embodiment, other wireless technologies, such as near-field communication (NFC), or sonic or ultrasonic ranging, may be used to determine the relative positions of electronic devices using methods such as time-of-flight, time-of-arrival, time-difference-of-arrival, and the like.

In another embodiment, a position of another electronic device may be determined based on position coordinates of electronic devices. For example, the electronic document manager 110 of the electronic device 102 may be configured to monitor one or more wireless communication components of the electronic device 102 for determining a position coordinate of the electronic device 102. The position coordinate may be one or more global positioning system (GPS) coordinates that are reported to the electronic document manager 110 by a GPS-enabled component residing on the electronic device 102. In another embodiment, the position coordinate may be relative to one or more wireless devices that may act as beacons, such as WI-FI®, Access Points. The electronic document manager 110 of the electronic device 102 may also be configured to determine a GPS coordinate of another electronic device, such as the electronic device 104. In an example, electronic devices, such as electronic devices 102 and 104, may report their position coordinates to a server, such as an electronic document server 116, via a suitable communications network, such as the network 114. In this example, the server 116 may include an electronic document coordinator 118 configured to receive position coordinates from electronic devices. The electronic document coordinator 118 may determine the electronic devices that are co-located or within a predetermined distance of one another based on the received position coordinates by use of a suitable technique. Further, the electronic document coordinator 118 may communicate information to the electronic devices to identify the other electronic devices that are in proximity. The recipient electronic devices, such as the electronic device 102, may use the information to determine whether another electronic device, such as the electronic device 104, is located within the predetermined distance to be a candidate for receipt of a selected electronic document. The electronic device 102 may also request that the server 116 report such position information about the electronic device 104.

In another example of using position coordinates to determine whether another electronic device is located within a predetermined position, the electronic device 102 may receive a position coordinate of the electronic device 104 by direct communication from the electronic device 104. For example, the electronic device 102 may use a peer-to-peer communication technology for requesting that the electronic device 104 communicate GPS coordinates of the electronic device 104. The electronic document manager 110 may manage the request of the information. In response to the request, the electronic device 104 may determine its present position coordinate and may communicate the position coordinate to the electronic device 102. In another example, position coordinates may be communicated between electronic devices via multicast or flooding communication techniques. Electronic devices may use the determined position coordinates to determine whether other electronic devices are within the predetermined distance and are thus candidates for receipt of a selected electronic document.

The method of FIG. 2A includes determining a registration status associated with the electronic device (step 204). For example, the electronic device 102 may store in a memory 120 a user identifier associated with the electronic device 104. The user identifier may be any suitable information for identifying the electronic device 104 such as, but not limited to, a username and password associated with the electronic device 104. In an example, the electronic document manager 110 of the electronic device 102 may determine whether the user identifier is registered with one or both of a social network and an electronic document provider, such as an electronic retailer. In response to determining that the user identifier is registered, the electronic device 104 can be a candidate for receipt of the selected electronic document.

In an example of determining whether a user identifier is registered with a social network, the electronic device 102 may communicate a user identifier to a social network server 122 for verifying registration of the user identifier with the social network. For example, the user identifier may include, but is not limited to, a username and password in a hashed or encrypted form, or a session key, other token, or type of identifier for a user of the electronic device 104. The social network server 122 may be a server configured to manage social network accounts, such as, for example, a FACEBOOK® social network account. The electronic document manager 110 may retrieve the user identifier stored in the memory 120, and may control the network interface 112 to communicate the user identifier to the social network server 122 along with a request for verifying registration of the user identifier. The user identifier and request may be communicated to the social network server 122 via the network 114 or any suitable communication technique. The social network server 122 may receive the user identifier and request via its network interface 112. Subsequently and responsive to the request for verifying the user identifier, a registration verification module 124 may check account records stored in memory 120 of social network server 122 to determine whether a record matches the user identifier for verifying registration. The registration verification module 124 may subsequently generate a message indicating whether the user identifier is registered, and may communicate the message to the electronic device 102 by control of the network interface 112 of the server 122. The electronic document manager 110 may access the message to determine whether the user identifier is registered. In response to determining that the user identifier is registered, the electronic device 104 can be a candidate for receipt of the selected electronic document. The user identifier or various authorization information may have been received from the electronic device 104.

In an example of determining whether a user identifier is registered with an electronic retailer, the electronic device 102 may communicate a user identifier to the electronic document server 116 for verifying registration of the user identifier with an electronic document provider. The electronic document server 116 may be a server configured to manage customer accounts, such as, for example, an AMAZON® customer account, a BARNES AND NOBLE® customer account, or an APPLE iBOOKS® customer account. The electronic document manager 110 of the server 116 may retrieve the user identifier stored in the memory 120, and may control the network interface 112 to communicate the user identifier to the electronic document server 116 along with a request for verifying registration of the user identifier. The user identifier and request may be communicated to the electronic document server 116 via the network 114 or any suitable communication technique. The electronic document server 116 may receive the user identifier and request via its network interface 112. Subsequently and responsive to the request for verifying the user identifier, the registration verification module 124 of the electronic document server 116 may check account records stored in its memory 120 to determine whether a record matches the user identifier for verifying registration. The registration verification module 124 may subsequently generate a message indicating whether the user identifier is registered, and may communicate the message to the electronic device 102 by control of the network interface 112 of the server 116. The electronic document manager 110 may access the message to determine whether the user identifier is registered. In response to determining that the user identifier is registered, the electronic device 104 can be a candidate for receipt of the selected electronic document.

In another example, a social network service or electronic document provider may provide an application programming interface (API) for use by an electronic device in accessing their services. An example of an electronic document provider's API is FACEBOOK® Connect. The API may be configured to accept a user's login credentials to authenticate and authorize an application using that API. The API may also assign a temporary session key to the application. The application may reside on an electronic device and may use the temporary session key to access user-specific data via the API for performing actions on the user's behalf. In this way, the electronic device, such as the electronic device 102, may verify registration of a user identifier.

The method of FIG. 2A includes communicating a portion of an electronic document to the electronic device based on the position and the registration status (step 206). For example, an electronic device may communicate a portion of an electronic document to another electronic device if the other electronic device is positioned within a predetermined distance and a user identifier of the other electronic device is registered with a social network or an electronic document provider. Referring to the example of FIG. 1, the electronic document manager 110 of the electronic device 102 may determine whether the electronic device 104 is positioned within a predetermined distance of the electronic device 102, and whether a user identifier associated with the electronic device 104 is registered with the electronic document server 116 or the social network server 122. In response to determining that the electronic device 104 meets these criteria, the electronic document manager 110 may communicate all or a portion of a selected electronic document, such as the e-book 108, to the electronic device 104.

In an example, the portion of the electronic document communicated to the other electronic device may be identified automatically or based on user input. For example, a portion of an e-book may be automatically identified based on a page that is currently being displayed to a user. The portion of the electronic document or e-book may also be determined based on other information such as social network information and information about the registration status of the users with the electronic document provider. In this example, a copy of the currently-displayed page may be communicated to the other electronic device. In this example, if the user changes the currently displayed page, a different portion of the e-book based on the newly displayed page may be automatically communicated to the other electronic device. In another example, a user may input an identifier for a page or other portion of an e-book, and the identified page or other portion may be communicated to the other electronic device. Example portions of an electronic document that may be identified for communication to another electronic device include, but are not limited to, one or more pages, one or more chapters, one or more sentences, one or more images, the like, and combinations thereof. The one or more pages, chapters, sentences or images may be determined based on the user's currently displayed page, predetermined selections by the author, editor, publisher or readers of the e-book, or the like.

The method of FIG. 2A includes communicating information restricting use of the portion of the electronic document (step 208). For example, the electronic document manager 110 of the electronic device 102 may control the network interface 112 to communicate to the electronic device 104 information on restricting use of the communicated portion of the e-book 108. The information may restrict use of the portion of the electronic document based on a position of the other electronic device. For example, the electronic document manager 110 of the electronic device 104 may control the user interface 106 to restrict use of a received portion of the e-book 108 based on a position of the electronic device 104. In an example, presentation of the electronic document portion may be restricted to times when the electronic device 104 is positioned within a predetermined distance of the electronic device 102. The electronic document manager 110 of the electronic device 104 may determine its position, a position of the electronic device 102, and whether the devices are positioned within a predetermined position of one another in accordance with any of the examples disclosed herein.

In another example, use of the portion of the electronic document may be restricted based on time. For example, the electronic document manager 110 may only present or otherwise use the electronic document portion for a predetermined time period. In a particular example, use of the portion may only be allowed for a time period of 24 hours after its receipt at the electronic device 104. In yet another example, the restrictions may apply to the user of device 102, such that the loaned document or the loaned portion of the document are not available to the user of device 102 while it is being used by user of the device 104. In this example, the device 102 may enable the user to revoke the shared document when needed, such as by interacting with the UI 106. In one embodiment, use of the portion of the electronic document may be restricted based on information about the social network relationship between the users of devices 102 and 104. For instance, the restrictions may be varied based on criteria such as the type of relationship, how closely the users are related in the social network, how well-acquainted the users are, how long the users have known each other, how long the users have been connected in the social network, how often they have previously shared portions of documents or other content, how often they communicate, and so on. In another embodiment, the portion of the electronic document may be restricted based on the registration status of one or both users with the electronic document provider. For instance, restrictions may be varied based on the type of accounts the users have, such as whether the users have premium accounts; the number and metadata of documents or other items the users have either previously purchased from the provider, consumed, recommended, reviewed or shared; other metadata about the user accounts; and the like.

The method of FIG. 2A includes receiving the portion of the electronic document and information restricting use (step 210). For example, an e-book portion 126 of the e-book 108 may be received from the electronic device 102 via the network 114. The electronic document manager 110 of the electronic device 104 may store the e-book portion 126 in the memory 120. In addition, information restricting use of the e-book portion 126 may be received at the electronic device 104 and stored in the memory 120.

Figure 2B:
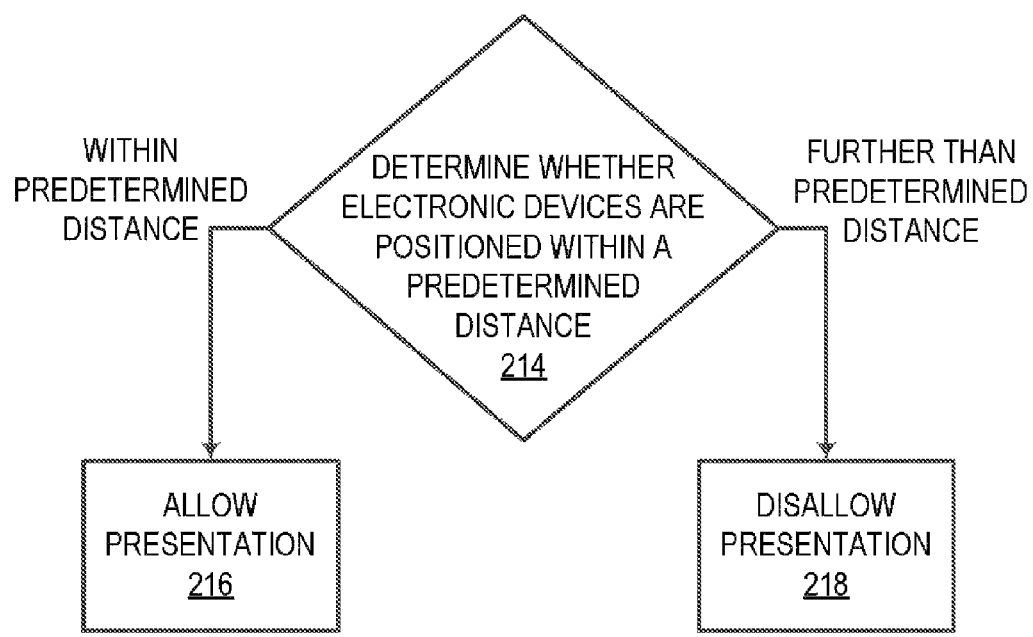
FIG. 2B illustrates a flow chart of an exemplary method for controlling use of a portion of an electronic document in accordance with embodiments of the present disclosure.

The method of FIG. 2A includes controlling use of the portion of the electronic document based on the received information (step 212). For example, the electronic document manager 110 of the electronic device 104 may access the use restriction information stored in the memory 120 for controlling display of the e-book portion 126. For example, FIG. 2B illustrates a flow chart of an exemplary method for controlling use of a portion of an electronic document in accordance with embodiments of the present disclosure. Referring to FIG. 2B, the electronic document manager 110 may determine whether the electronic devices 102 and 104 are positioned within a predetermined distance of each other (step 214). In response to determining that the devices 102 and 104 are within the predetermined distance, presentation of the e-book portion 126 may be allowed (step 216). In response to determining that the electronic devices 102 and 104 are positioned further than the predetermined distance from each other, the electronic document manager 110 may disallow presentation of the e-book portion 126 (step 218). The electronic device 104 may determine its position with respect to the electronic device 102 in accordance with any of the examples disclosed herein that the electronic device 102 uses for determining positioning of electronic devices. The e-book portion 126 may be presented via a display of the electronic device 104.

In an embodiment, all or a portion of an electronic document may be communicated from an electronic device to another electronic device through a server. For example, the electronic device 102 may communicate the e-book portion 126 to the server 116 for delivery to the electronic device 104. The server 116 may receive an encryption key from the electronic device 102 for use in communicating the e-book portion 126 to the electronic device 104. In another embodiment, the server 116 may receive information regarding the identification of the document and the portion to be shared from device 102, and the server 116 may generate the portion of the document from a copy stored in its own document database, such as memory 120 of the server 116 or another database, and may communicate it to device 104. The server may encrypt, or apply DRM restrictions to, the portion of the document before communicating it to device 104, and may communicate the decryption key thereto. In another embodiment, the server 116 may instead receive all the relevant information from one or both of devices 102 and 104, such as the information about the user identification information, registration status, social network relationship and device positions, and may determine the portion of the document to be shared, and communicate the portion to the device 104.

In an embodiment, a referral credit from an electronic retailer may be applied based on communication of all or a portion of an electronic document to another electronic device. For example, an electronic retailer may operate the electronic document server 116. The electronic device 102 may communicate to the electronic device 104 a portion of an electronic document in accordance with one of the examples disclosed herein. Either the electronic device 102 or the electronic device 104 may report information to the server 116 for indicating the communication of the electronic document portion and for identifying a user associated with the electronic device 102. In response to receipt of the report, the electronic document server 116 may apply a referral credit to the identified user. In another example, the referral credit may only be applied in response to a purchase of the electronic document from the electronic retailer. Such a purchase may be made through the server 116. For example, the electronic device 104 may communicate with the server 116 to conduct a transaction for purchase of the electronic document 108.

Figure 3:
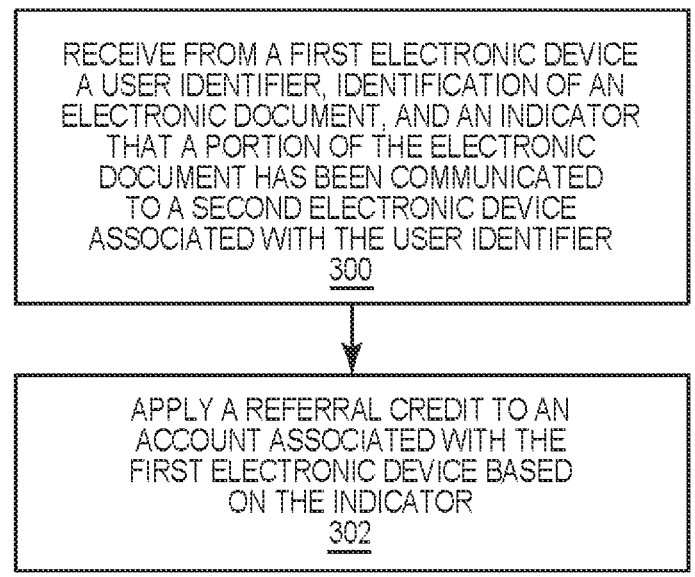
FIG. 3 is a flow chart of an exemplary method for applying a referral credit based on communication of an electronic document in accordance with embodiments of the present disclosure.

FIG. 3 illustrates a flow chart of an exemplary method for applying a referral credit based on communication of an electronic document in accordance with embodiments of the present disclosure. The method of FIG. 3 is described with respect to the example system 100 shown in FIG. 1, although the method may be implemented by any suitable system or electronic device. Various steps of FIG. 3 may be implemented entirely, or in part, by an electronic document coordinator 118 residing on the server 116 shown in FIG. 1. The electronic document coordinator 118 may be implemented by software, hardware, firmware, or combinations thereof.

Referring to FIG. 3, the method includes receiving from an electronic device a user identifier, identification of an electronic document, and an indicator that a portion of the electronic document has been communicated to another electronic device associated with the user identifier (step 300). For example, the electronic device 102 may have communicated the e-book portion 126 to the electronic device 104. In response to receipt of the e-book portion 126, the electronic document manager 110 may control the communication of a user identifier associated with the electronic device 102, identification of the e-book 108, and an indicator that the e-book portion 126 has been communicated to the electronic device 104. The information may be communicated by the network interface 112 via the network 114.

The method of FIG. 3 includes applying a referral credit to an account associated with the electronic device that sent the electronic document portion based on the indicator (step 302). For example, the electronic document coordinator 118 may control one or more components of the server 116 for applying a credit to an account of a user associated with the electronic device 102. The credit may be used when the user of the electronic device 102 purchases content through the electronic retailer. In another example, the referral credit may be applied when a user of the electronic device 104 purchases a copy of the e-book 108.

In another embodiment, a portion of the electronic document communicated to another electronic device may be based on a social network relation between user identifiers of electronic devices. For example, a user of the electronic device 102 and a user of the electronic device 104 may be friends via a social network, such as a social network managed by the social network server 122, which may provide an indication of the relation to one or both of the electronic devices 102 and 104. The particular portion of the electronic document communicated to the electronic device 104 may be determined based on the relation. For example, the portion may be larger in size if the users are friends in the social network. Further, use of the electronic document portion may be restricted based on the social network relation. For example, the amount of time that the recipient is allowed to present the portion may be based on the relation. The portion of the electronic document and the use restrictions information may also be determined based on other information about the social network relationship between the users, such as the type of relationship, how closely the users are related in the social network, how well-acquainted the users are, how long the users have known each other, how long the users have been connected in the social network, how often they have previously shared portions of documents or other content, how often they communicate, and so on.

In another embodiment, one or more bookmarks may be communicated to another electronic device for identifying one or more positions within a communicated portion of an electronic document. For example, a user of the electronic device 102 may interact with the user interface 106 for bookmarking or otherwise identifying one or more parts of the e-book 108. The bookmarks may be communicated to the electronic device 104 along with the e-book portion 126. During presentation of the e-book portion 126, the bookmarks may be displayed for indicating particular parts of the e-book portion 126.

In another embodiment, presentation of an electronic document may be allowed in response to registration of a social network or an electronic retailer. For example, the electronic device 104 may receive the e-book portion 126, or information identifying the portion. The electronic document manager 110 may indicate that presentation of the e-book portion 126 is not allowed without registration. Particularly, in this example, presentation of the e-book portion 126 may not be allowed unless the user of the electronic device 104 is registered with one or both of a social network or an electronic retailer. The user may subsequently be presented with information on registering, such as via a website. The user may interact with the user interface 106 of the electronic device 104 for accessing the website and registering with the social network or the electronic retailer. In response to registration, the e-book portion 126 may be accessed and presented to the user via the user interface 106.

Figure 4:
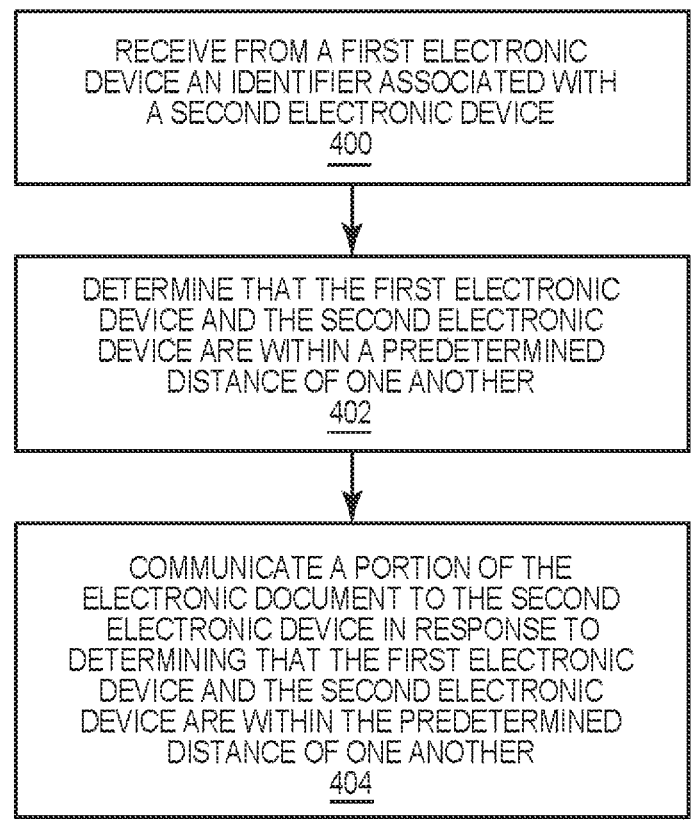
FIG. 4 is a flow chart of an exemplary method for assisting communication of an electronic document from one electronic device to another electronic device in accordance with embodiments of the present disclosure.

FIG. 4 illustrates a flow chart of an exemplary method for assisting communication of an electronic document from one electronic device to another electronic device in accordance with embodiments of the present disclosure. The method of FIG. 4 is described with respect to the example system 100 shown in FIG. 1, although the method may be implemented by any suitable system or electronic device. Various steps of FIG. 4 may be implemented entirely, or in part, by an electronic document coordinator 118 residing on the server 116 shown in FIG. 1. The electronic document coordinator 118 may be implemented by software, hardware, firmware, or combinations thereof.

Referring to FIG. 4, the method includes receiving from a first electronic device an identifier associated with a second electronic device (step 400). For example, the electronic device 102 may communicate to the server 116 an identifier of the second electronic device 104. In addition, the electronic device 102 may communicate to the server 116 a portion of an electronic document or an identifier of the portion of the electronic document. The electronic device 102 may indicate that the server 116 is to communicate the portion of the electronic document to the electronic device 104.

The method of FIG. 4 includes determining that the first electronic device and the second electronic device are within a predetermined distance of one another (step 402). For example, the electronic document coordinator 118 of the server 116 may determine whether the first and second electronic devices 102 and 104 are positioned within a predetermined distance of one another. In response to determining that the electronic devices 102 and 104 are not positioned within the predetermined distance, communication of the electronic document portion is to be disallowed by the electronic document coordinator 118. In response to determining that the electronic devices 102 and 104 are positioned within the predetermined distance, the electronic document coordinator 118 may initiate and manage communication of the electronic document portion to the electronic device 104.

The method of FIG. 4 includes communicating a portion of the electronic document to the second electronic device in response to determining that the first electronic device and the second electronic device are within the predetermined distance of one another (step 404). Continuing the aforementioned example, the electronic document coordinator 118 may control the network interface 112 to communicate the electronic document portion to the electronic device 104 in response to determining that the electronic devices 102 and 104 are positioned within the predetermined distance. In an example, the electronic document portion, such as the e-book portion 126, may be communicated from the electronic device 102 to the server 116 for forwarding to the electronic device 104. In another example, the server 116 may have a copy of the e-book 108 stored in the memory 120 or in another database, and the electronic document coordinator 118 may use the stored copy for forwarding a portion thereof to the electronic device 104.

In an embodiment, the electronic document coordinator 118 may verify that an identifier associated with the electronic device 104 is registered with a social network or an electronic retailer. In an example, the electronic document coordinator 118 may check records stored in the memory 120 for verifying whether an identifier of the electronic device 104 is associated with an electronic retailer as with some of the examples disclosed herein. In another example, the electronic document coordinator 118 may query the social network server 122 for verifying whether an identifier of the electronic device 104 is associated with a social network as with some of the examples disclosed herein.

In an embodiment, subsequent to communicating the electronic document portion to an electronic device, such as the electronic device 104, the electronic device may conduct a transaction with the server 116 or another server for purchase of the electronic document. In response to the purchase transaction, the server 116 may apply a referral credit to a user identifier associated with the electronic device 102.

Figure 5A:
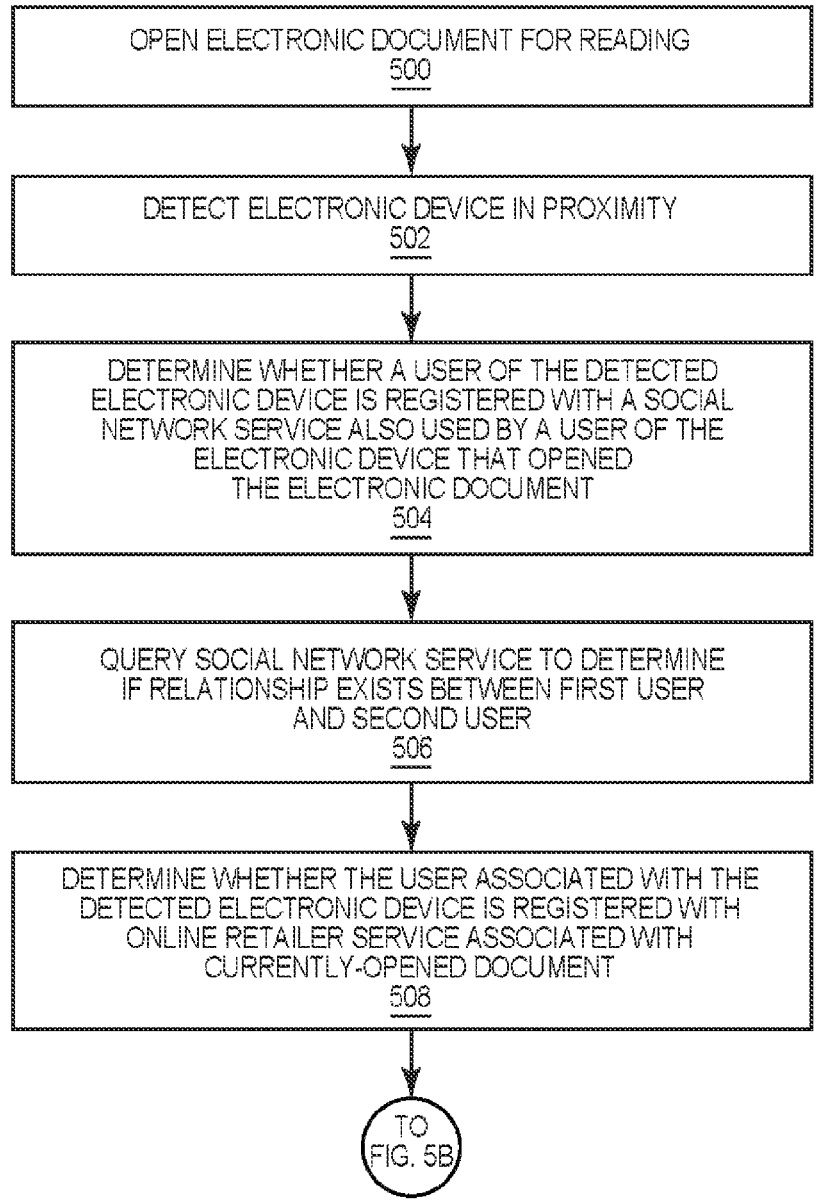
FIGS. 5A and 5B are a flow chart of an exemplary method for position-based loaning of electronic documents to electronic device users in accordance with embodiments of the present disclosure.
Figure 5B:
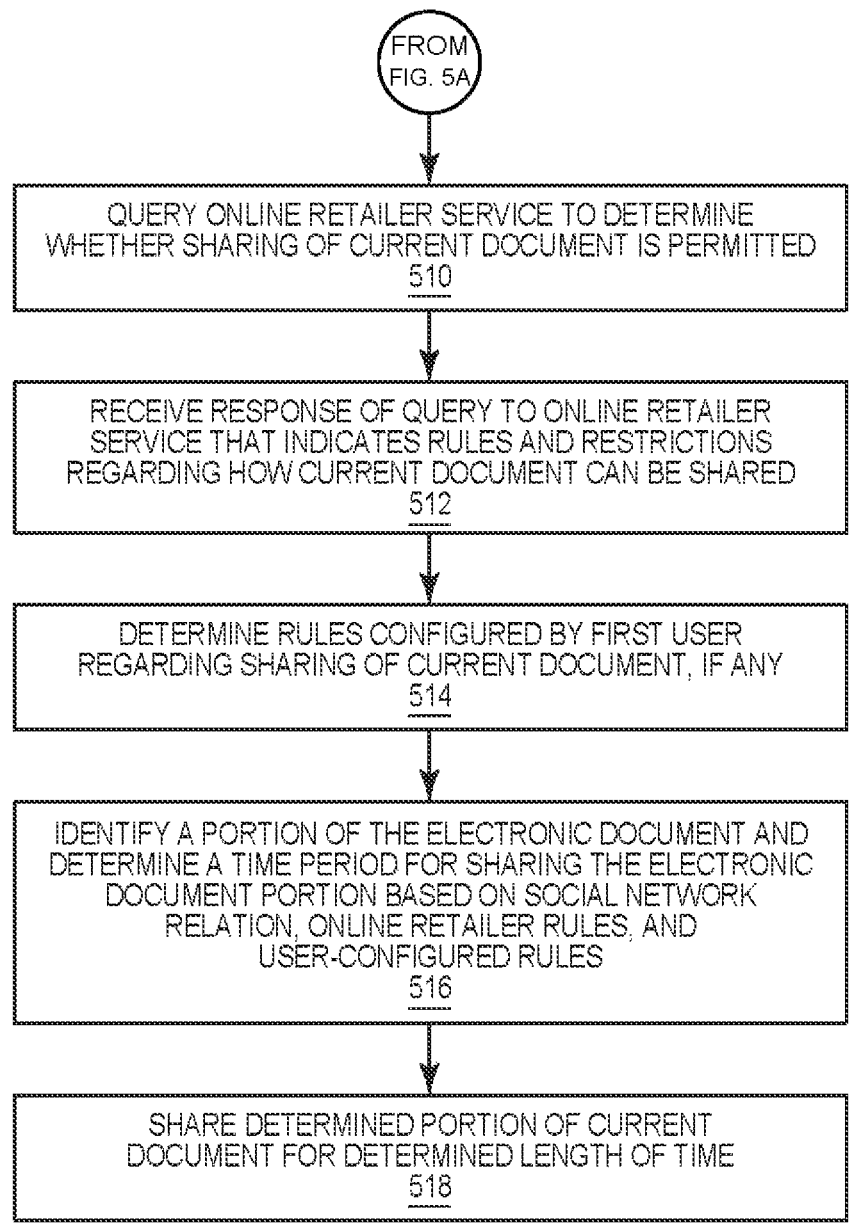

In accordance with embodiments of the present disclosure, FIGS. 5A and 5B illustrate a flow chart of an exemplary method for position-based loaning of electronic documents to electronic device users. The method of FIGS. 5A and 5B is described with respect to the example system 100 shown in FIG. 1, although the method may be implemented by any suitable system or electronic device. Various steps of FIGS. 5A and 5B may be implemented entirely, or in part, by the electronic document manager 110 residing on the electronic device 102 shown in FIG. 1. The electronic document manager 110 may each be implemented by software, hardware, firmware, or combinations thereof.

Referring to FIGS. 5A and 5B, the method includes opening an electronic document for reading (step 500). For example, a user of the electronic device 102 may input commands into the user interface 106 for opening the e-book 108 and for displaying the e-book 108.

The method of FIGS. 5A and 5B includes detecting an electronic device in proximity (step 502). For example, the electronic document manager 110 of the electronic device 102 may determine that the electronic device 104 is positioned within a predetermined distance in accordance with embodiments disclosed herein. In this case, the electronic device 104 may be determined to be a candidate for receipt of all or a portion of the e-book 108.

The method of FIGS. 5A and 5B includes determining whether a user of the detected electronic device is registered with a social network service also used by a user of the electronic device that opened the electronic document (step 504). The electronic device that opened the electronic document may query a social network service to determine whether a relationship exists between the first user and the second user (step 506). Continuing the aforementioned example, the electronic device 102 may obtain a user identifier and authentication information of the electronic device 104 for use in determining whether the user identifier is registered with a social network service with which a user of the electronic device 104 is registered. Further, the electronic device 102 may query the server 122 to determine whether the users are identified as friends, as well as to obtain information about their social network relationship.

The method of FIGS. 5A and 5B includes determining whether the user associated with the detected electronic device is registered with an online retailer service associated with the currently-opened electronic document (step 508). For example, the electronic device 102 may determine whether the user of the electronic device 104 is registered with an online retailer service associated with the e-book 108, such as an online retailer service that operates the server 116.

The electronic device may subsequently query the online retailer service to determine whether sharing of the currently-opened electronic document is permitted (step 510). For example, such a query may be communicated by the electronic device 102 to the server 116. Subsequently, the electronic device may receive a response to the query that indicates restrictions regarding how the currently-opened electronic document can be shared (step 512). For example, the response may indicate time restrictions on sharing the electronic document, position restrictions on the recipient electronic device as with the disclosed examples, restrictions on portions of the electronic document that may be shared, the like, and combinations thereof.

The method of FIGS. 5A and 5B includes determining rules configured by the user regarding sharing of the currently-opened electronic document (step 514). For example, the electronic device 102 may determine such rules, if any, set by the user. Such rules may include any of the various restrictions on presentation of an electronic document to a recipient device as disclosed herein.

The method of FIGS. 5A and 5B includes identifying a portion of the electronic document for sharing and determining a time period for sharing the electronic document based on the social network relation, the online retailer rules, and the user-configured rules (step 516). For example, the information gathered in steps 506, 512, and 514 may be used for identifying the e-book portion 126 and for determining a predetermined time period for sharing the e-book portion 126.

The method of FIGS. 5A and 5B includes sharing the determined electronic document portion for the predetermined time period (step 518). For example, the e-book portion 126 may be communicated by the electronic device 102 to the electronic device 104. Further, for example, the electronic device 102 may communicate to the electronic device 104 information indicating the predetermined time period within which the electronic device 104 may allow presentation of the e-book portion 126. In an embodiment, one or both of devices 102 and 104 may communicate with the social network server 122 to update a status or post a message regarding the sharing of the portion of the document.

Figure 6:
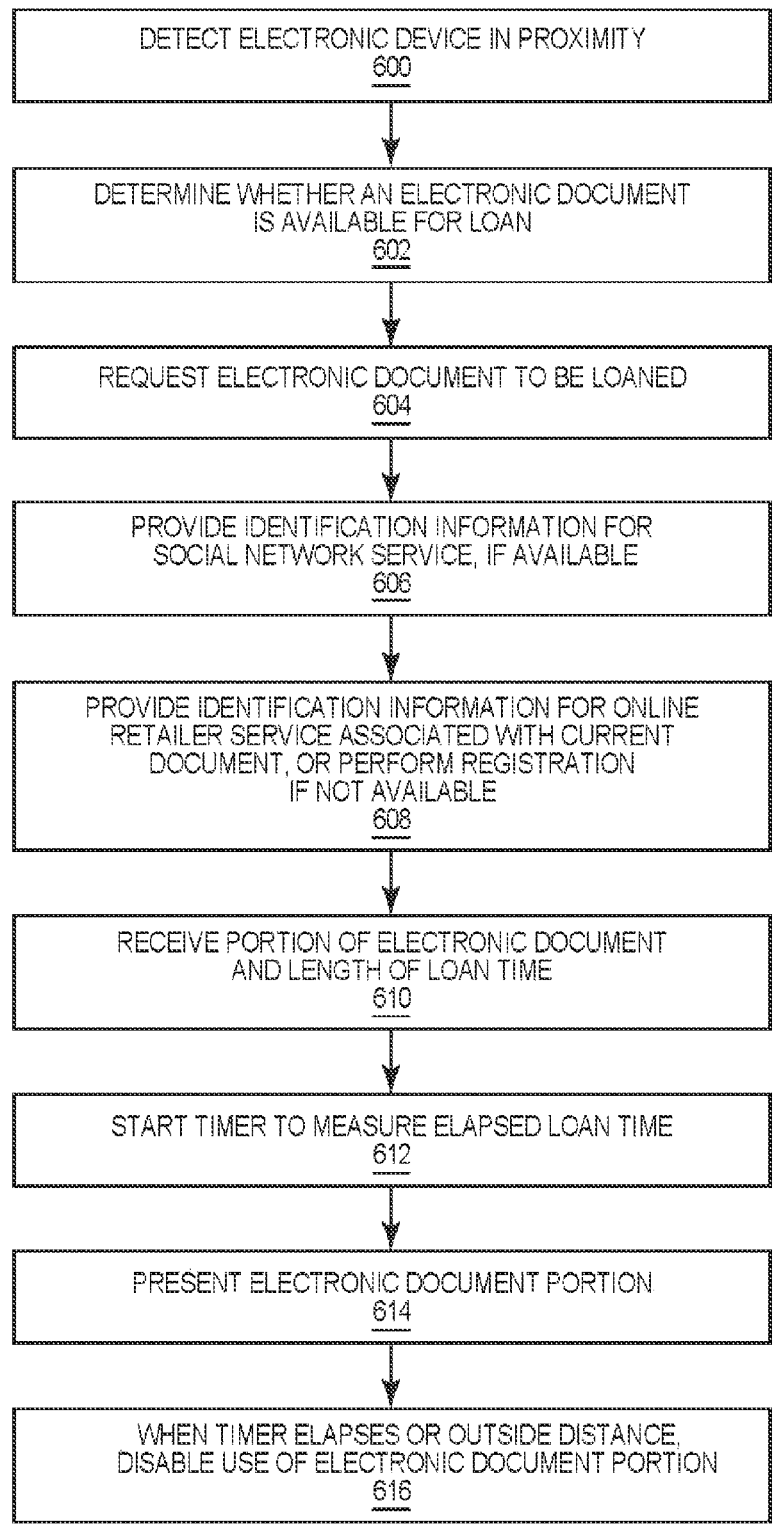
FIG. 6 is a flow chart of an exemplary method for position-based loaning of electronic documents to electronic device users in accordance with embodiments of the present disclosure.

In accordance with embodiments of the present disclosure, FIG. 6 illustrates a flow chart of an exemplary method for position-based loaning of electronic documents to electronic device users. The method of FIG. 6 is described with respect to the example system 100 shown in FIG. 1, although the method may be implemented by any suitable system or electronic device. Various steps of FIG. 6 may be implemented entirely, or in part, by the electronic document manager 110 residing on the electronic device 104 shown in FIG. 1. The electronic document manager 110 may each be implemented by software, hardware, firmware, or combinations thereof.

Referring to FIG. 6, the method includes detecting one or more electronic devices in proximity (step 600). For example, the electronic document manager 110 of the electronic device 104 may determine that the electronic device 102 is positioned within a predetermined distance in accordance with embodiments disclosed herein. If multiple devices are in proximity, the user of device 104 may be presented a list of the devices, from which the user may select one for further discovery. For instance, the user may select device 102. In response to detecting the electronic device, it may be determined whether an electronic document is available for loan from the detected electronic device (step 602). For example, device 104 may query device 102 and other proximate devices for a list of documents that are available for loan. Further, a request for the electronic document to be loaned may be communicated (step 604). For example, a user of the electronic device 104 may input an identifier of the e-book 108 and a command to request for loan of the e-book 108 or a portion thereof from the electronic device 102.

The method of FIG. 6 includes providing identification information for a social network service (step 606). For example, the electronic device 104 may provide to the electronic device 102 an identifier of a social network service for use by the electronic device 102 in verifying registration of a user of the electronic device 104.

The method of FIG. 6 includes providing identification information for an online retailer service associated with an identified electronic document (step 608). For example, the electronic device 104 may provide to the electronic device 102 an identifier of an online retailer service with which the user of the electronic device 104 is registered, if available. If unregistered, the electronic device 104 may perform registration with the online retailer service. In one embodiment, the device 104 may provide the social network and online retailer registration information to device 102 preemptively before step 602, so as to reduce the number of individual communications between the devices, and this may influence the result of step 602.

The method of FIG. 6 includes receiving the requested electronic document, or a portion thereof, and information indicating a length of loan time (step 610). For example, the electronic device 104 may receive the e-book portion 126 from the electronic device 102. Further, the electronic device 104 may receive a predetermined time period for presentation of the e-book portion 126.

The method of FIG. 6 includes starting a timer to measure an elapsed loan time (step 612). For example, the electronic device 104, upon receipt of the electronic document portion and the predetermined time period, may start a timer for tracking the time period within which the e-book portion 126 may be presented.

The method of FIG. 6 includes presenting the electronic document portion (step 614). For example, the user interface 106 of the electronic device 104 may present the e-book portion 126 by use of a display.

The method of FIG. 6 includes disabling use of the electronic document portion when the loan timer elapses or if the devices 102 and 104 are outside of a predetermined distance from one another (step 616). For example, at the end of the predetermined time period, presentation of the e-book portion 126 may be disallowed. In another example, presentation of the e-book portion 126 may be disallowed if either device 102 or 104 detect that they are no longer within a predetermined distance of each other.

Figure 7:
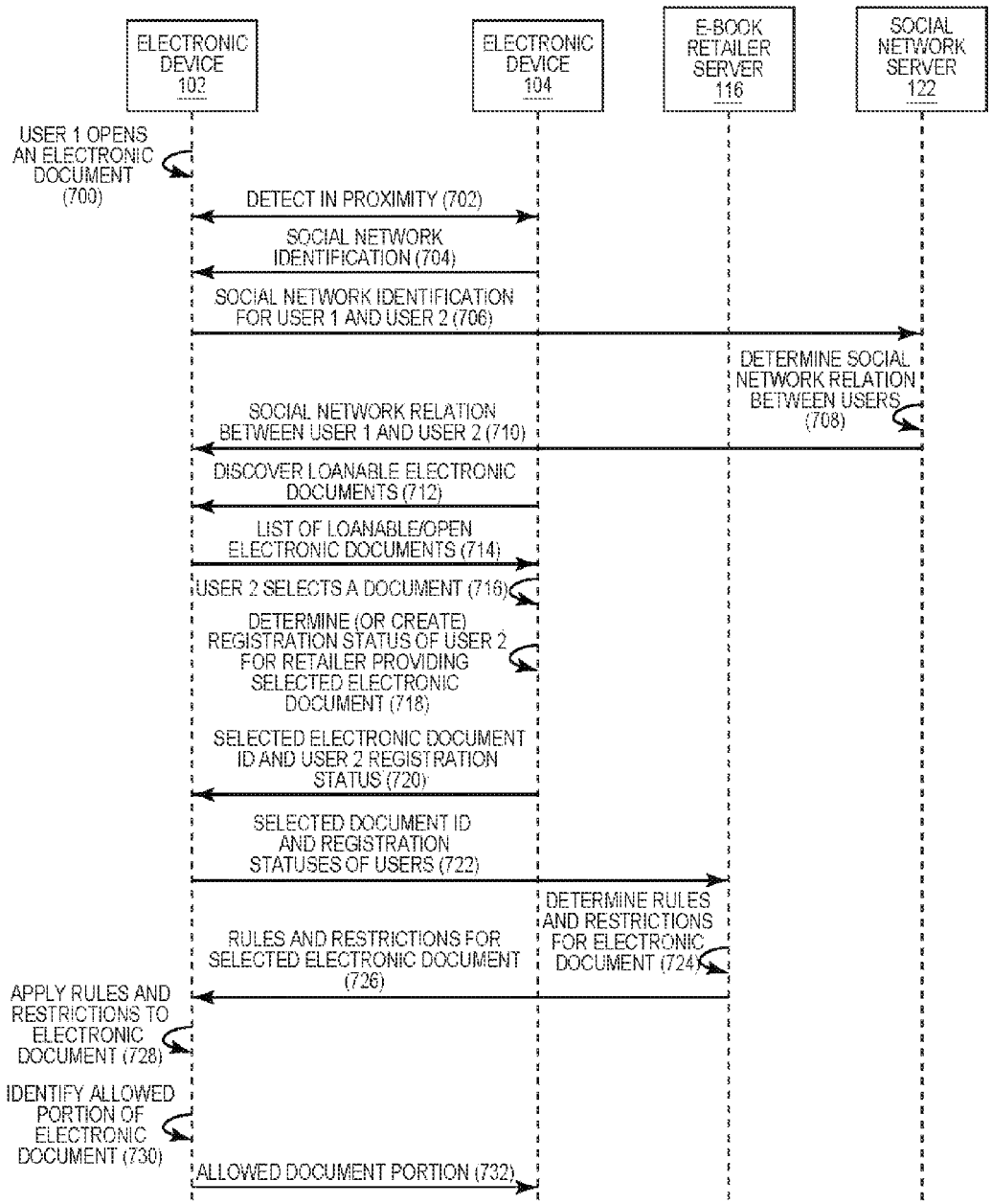
FIG. 7 is a message flow diagram of an exemplary operation of the system shown in FIG. 1 in accordance with embodiments of the present disclosure.

FIG. 7 illustrates a message flow diagram of an exemplary operation of the system 100 shown in FIG. 1 in accordance with embodiments of the present disclosure. Referring to FIG. 7, the electronic device 102 may open an electronic document (step 700). At step 702, one or both of the electronic devices 102 and 104 detect that they are within a predetermined distance of each other.

Subsequently, the electronic device 104 communicates social network identification of a User 2 to the electronic device 102 (step 704). In response to receipt of the social network identification of User 2, the electronic device 102 communicates the social network identification for User 1 and User 2 to the social network 122 (step 706). Subsequently, the social network server 122 determines the social network relationship between Users 1 and 2 based on the received social network identification (step 708). The social network server 122 may then communicate information about the social network relation between Users 1 and 2 to the electronic device 102 (step 710). For example, a status of Users 1 and 2 may be "friend." The electronic device 104 may then be considered a candidate for sharing of electronic documents based on the "friend" status. In an embodiment where multiple devices are in proximity, the list of devices that device 102 or 104 may communicate with may be filtered based on the social network status between the users of the respective devices. For example, only those devices whose users have a social network relation status as "friend" may be selected. User 2 may then be presented a list of devices and their users, of which User 2 may select one, such as device 102 and User 1, before proceeding.

At step 712, the electronic device 104 may communicate to the electronic device 102 a message for discovery of loanable electronic documents. In response to receipt of the discovery message, the electronic device 102 may communicate to the electronic device 104 a list of loanable or open electronic documents (step 714). User 2 may input a command for selecting one of the listed documents (step 716). Subsequently, the electronic device 104 may determine (or create) a registration status of User 2 for a retailer providing the selected electronic document (step 718). The electronic device 104 may then communicate to the electronic device 102 an identifier of the selected electronic document and a registration status of User 2 (step 720).

In response to receipt of the selected document identifier and User 2's registration status, the electronic device 102 may communicate to the e-book retailer server 116 the selected document identifier and the registration statuses of Users 1 and 2 (step 722). At step 724, the e-book retailer server 116 determines rules and restrictions for the electronic document. The e-book retailer server 116 communicates to the electronic device 102 the rules and restrictions to the electronic document (step 726). In response to the rules and restrictions, the electronic device 102 applies the rules and restrictions to the electronic document (step 728). The electronic device 102 may identify an allowed portion of the electronic document (step 730). Subsequently, the allowed electronic document portion may be communicated to the electronic device 104 (step 732). In addition, the electronic device 102 may communicate to the electronic device 104 information on restrictions for use of the electronic document.

Figure 8:
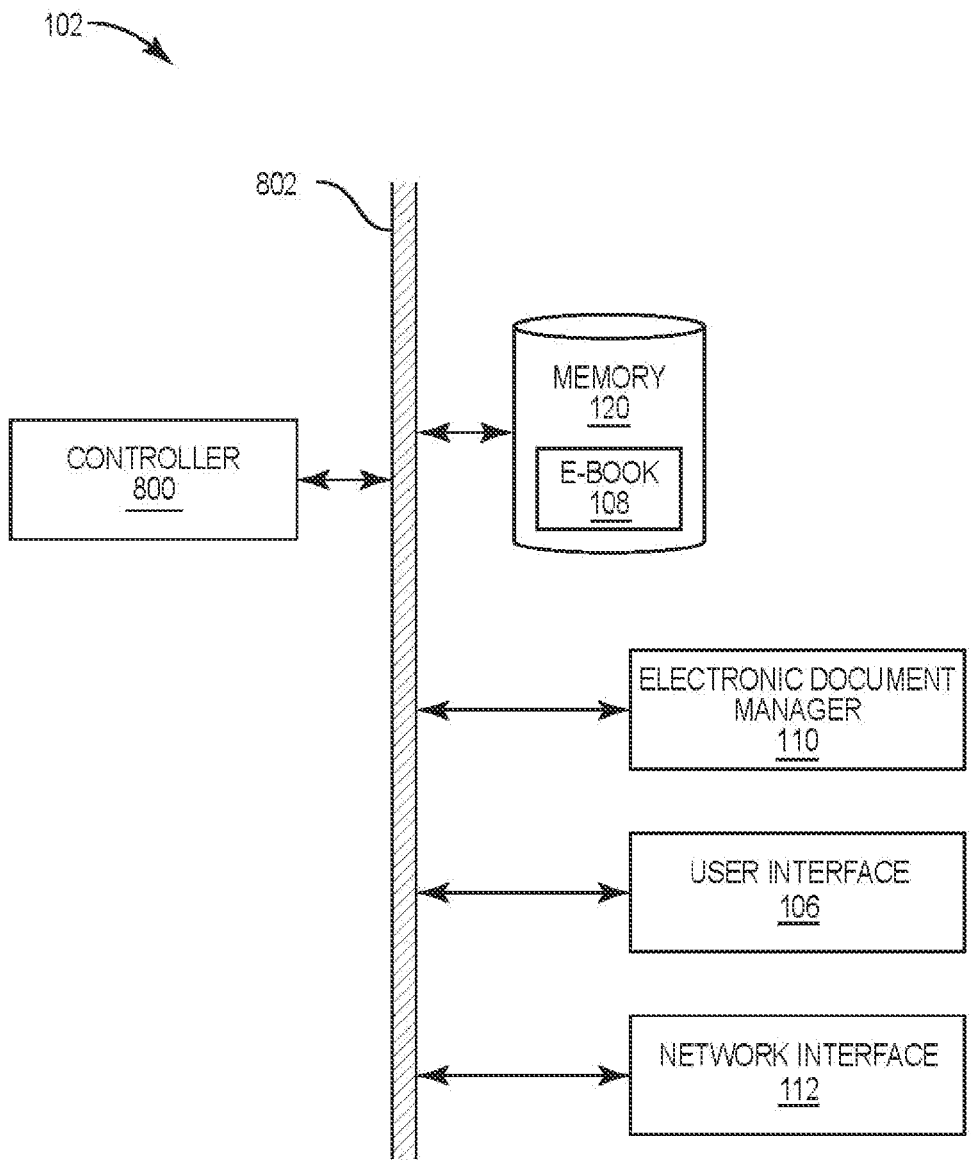
FIG. 8 is a block diagram of the electronic device 102 or 104 shown in FIG. 1 according to embodiments of the present disclosure.

FIG. 8 is a block diagram of the electronic device 102 shown in FIG. 1 according to embodiments of the present disclosure. Alternatively, the block diagram may depict the electronic device 104 shown in FIG. 1 or any other suitable electronic device. Referring to FIG. 8, the electronic device 102 may include a controller 800 connected to the memory 120, the electronic document manager 110, the user interface 106, and the network interface 112 by a bus 802 or similar mechanism. The memory 120 may store the e-book 108. The controller 800 may be a microprocessor, digital ASIC, FPGA, or the like. In this example, the controller 800 is a microprocessor, and the electronic document manager 110 is implemented in software and may be stored in a suitable memory or data store. The network interface 112 may be a local wireless interface such as a wireless interface operating according to one of the suite of IEEE 802.11 standards, a mobile communications interface, or the like. The user interface 106 may include, for example, a touchscreen, a display, one or more user input components (e.g., a keypad), a speaker, or the like, or any combination thereof.

Figure 9:
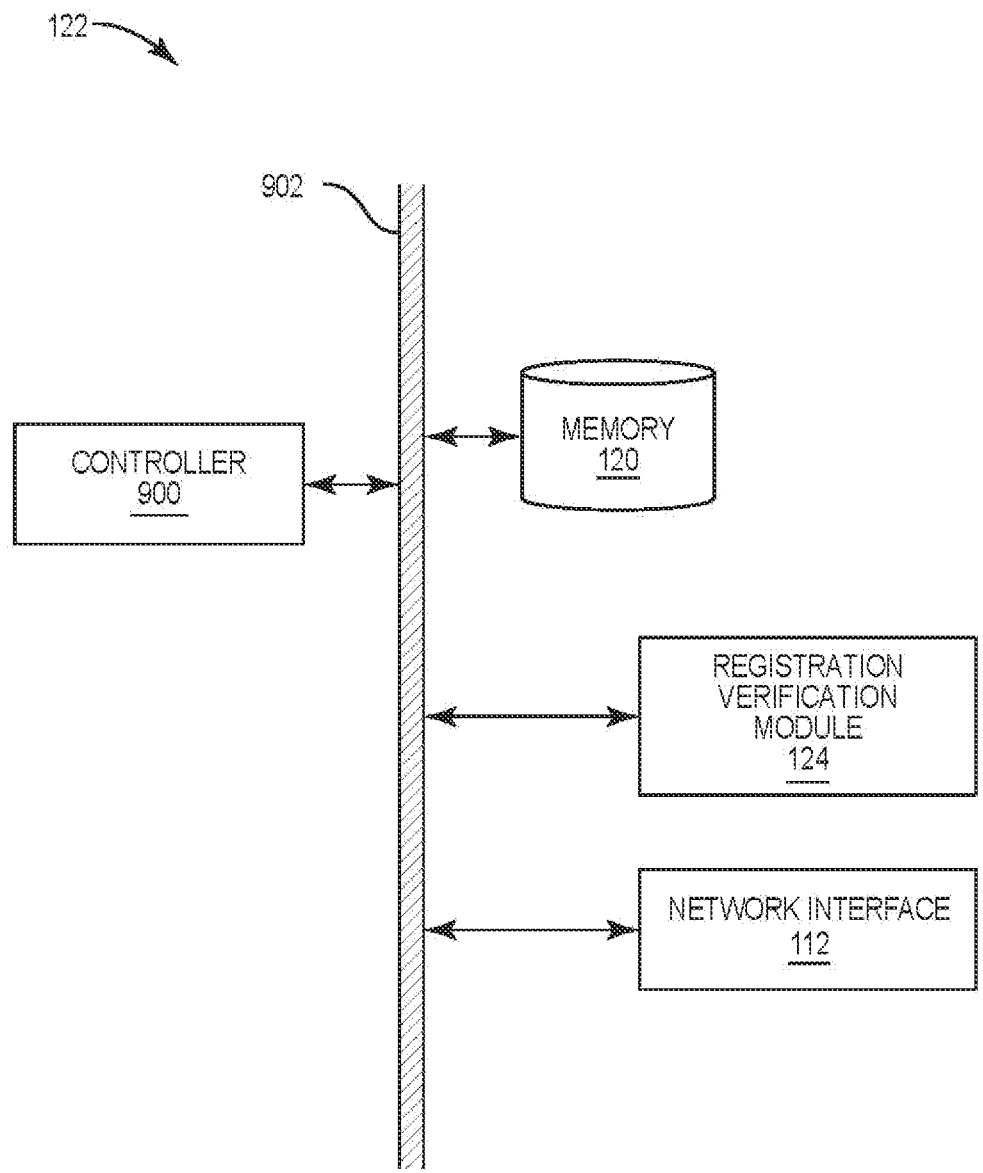
FIG. 9 is a block diagram of the social network server shown in FIG. 1 according to embodiments of the present disclosure.

FIG. 9 is a block diagram of the social network server 122 shown in FIG. 1 according to embodiments of the present disclosure. Referring to FIG. 9, the server 122 may include a controller 900 connected to the memory 120, the registration verification module 124, and the network interface 112 by a bus 902 or similar mechanism. The controller 900 may be a microprocessor, digital ASIC, FPGA, or the like. In this example, the controller 900 is a microprocessor, and the registration verification module 124 is implemented in software and may be stored in a suitable memory or data store. The network interface 112 may be a local wireless interface such as a wireless interface operating according to one of the suite of IEEE 802.11 standards, a mobile communications interface, or the like.

Figure 10:
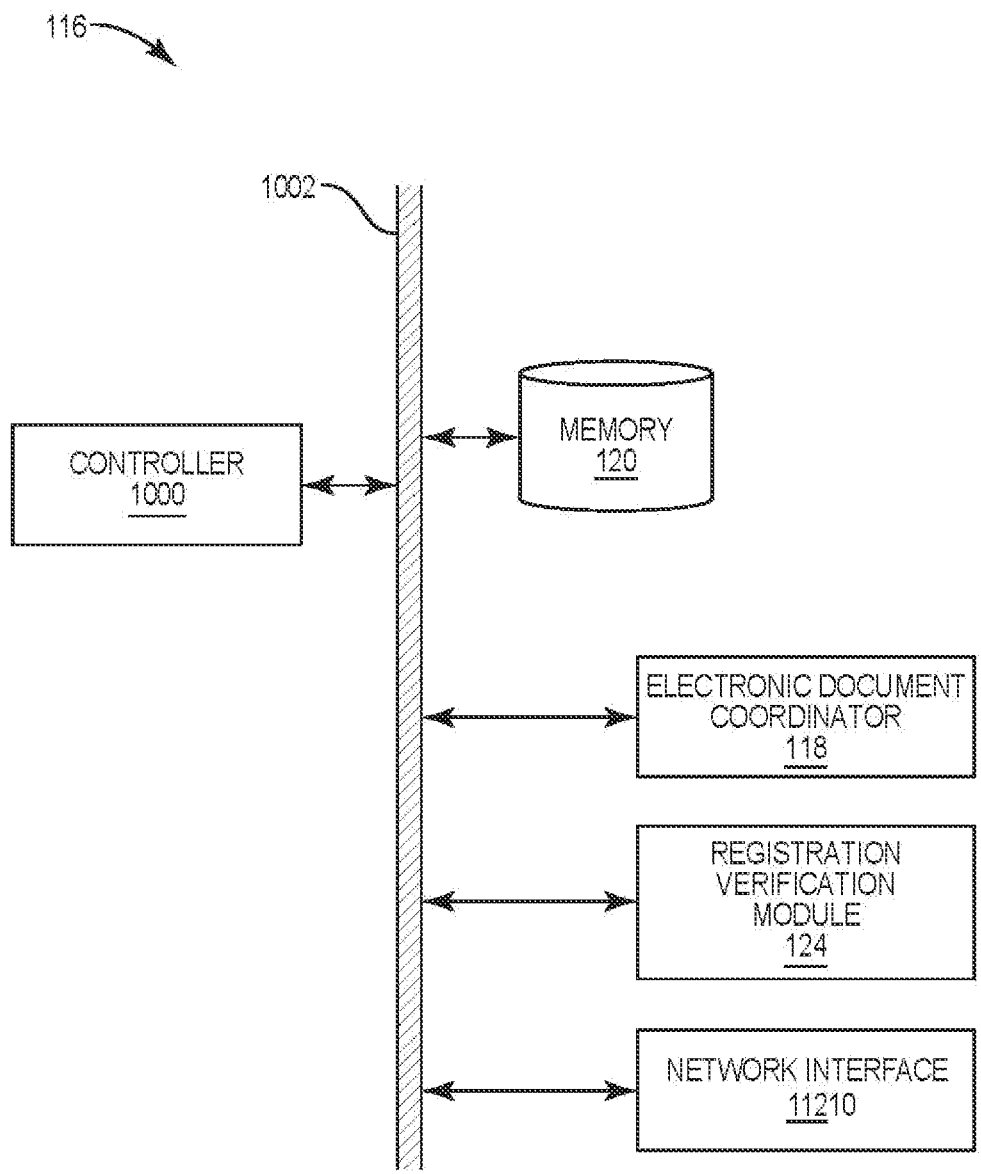
FIG. 10 is a block diagram of the electronic document server shown in FIG. 1 according to embodiments of the present disclosure.

FIG. 10 is a block diagram of the electronic document server 116 shown in FIG. 1 according to embodiments of the present disclosure. Referring to FIG. 10, the server 116 may include a controller 1000 connected to the memory 120, the electronic document coordinator 118, the registration verification module 124, and the network interface 112 by a bus 1002 or similar mechanism. The controller 1000 may be a microprocessor, digital ASIC, FPGA, or the like. In this example, the controller 1000 is a microprocessor, and the registration verification module 124 is implemented in software and may be stored in a suitable memory or data store. The network interface 112 may be a local wireless interface such as a wireless interface operating according to one of the suite of IEEE 802.11 standards, a mobile communications interface, or the like.

In the embodiments and examples disclosed herein, an electronic document is described as being loaned or shared among electronic devices, although the systems and methods disclosed herein may similarly be applied to any suitable type of multimedia. For example, suitable multimedia to which the example systems and methods disclosed herein may be applied include, but are not limited to, video, music, and photos.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
at a first electronic device:
receiving, from a second electronic device, a request for at least one electronic document available for share;
in response to the request, communicating, to the second electronic device, a list of electronic documents available for share;
receiving selection of the at least one electronic document from the list of electronic documents available for share;
receiving a user identifier associated with the second electronic device from the second electronic device;
verifying a registration status of the user identifier associated with the second electronic device with at least one of a social network and an electronic document identifier; and
in response to verifying the registration status of the user identifier associated with the second electronic device, communicating, to the second electronic device, a portion of the at least one electronic document and information restricting use of the portion of the at least one electronic document.

2. The method of claim 1, further comprising:
determining a position of the first electronic device with respect to the second electronic device.

3. The method of claim 2,
wherein determining the position comprises determining whether the first electronic device is positioned within a predetermined distance from the second electronic device, and
wherein the portion of the electronic document is communicated to the second electronic device in response to determining that the first electronic device is positioned within the predetermined distance from the second electronic device.

4. The method of claim 2,
wherein determining the position comprises determining whether the first electronic device and the second electronic device are in wireless communication, and
wherein the portion of the at least one electronic document is communicated to the second electronic device in response to determining that the first electronic device and the second electronic device are in wireless communication.

5. The method of claim 2,
wherein determining the position comprises determining whether a signal quality of a wireless communication connection between the first electronic device and the second electronic device is greater than a predetermined signal quality level, and
wherein the portion of the at least one electronic document is communicated to the second electronic device in response to determining that the signal quality of the wireless communication connection between the first electronic device and the second electronic device is greater than the predetermined signal quality level.

6. The method of claim 2,
wherein determining the position comprises:
  determining a position coordinate of the first electronic device and a position coordinate of the second electronic device;
  determining whether a distance between the position coordinate of the first electronic device and the position coordinate of the second electronic device is less than a predetermined distance, and
wherein the portion of the at least one electronic document is communicated to the second electronic device in response to determining that the distance between the position coordinate of the first electronic device and the position coordinate of the second electronic device is less than the predetermined distance.

7. The method of claim 2,
wherein determining the position comprises:
  using a ranging protocol of a wireless communication connection between the first electronic device and the second electronic device to determine a distance between the first and second electronic devices; and
  determining whether the distance is less than a predetermined distance, and wherein the portion of the at least one electronic document is communicated to the second electronic device in response to determining that the distance is less than the predetermined distance.

8. The method of claim 1, wherein communicating, to the second electronic device, the portion of the at least one electronic document comprises communicating the portion of the at least one electronic document from the first electronic device to a server associated with the electronic document provider for delivery to the second electronic device.

9. The method of claim 8, further comprising communicating an encryption key to the server for use in communicating the at least one electronic document to the second electronic device.

10. The method of claim 1, wherein verifying a registration status of the user identifier associated with the second electronic device comprises:
  communicating the user identifier to a server for verification of registration with the at least one of the social network and the electronic document provider; and
  receiving verification that the user identifier is registered with the at least one of the social network and the electronic document provider.

11. The method of claim 10, wherein receiving verification comprises receiving authorization information associated with the user identifier.

12. The method of claim 1, wherein the user identifier comprises a password associated with the user identifier.

13. The method of claim 1, further comprising identifying the portion of the at least one electronic document.

14. The method of claim 13, wherein the identified portion comprises one of an identified page, chapter, paragraph, sentence, and image of the at least one electronic document.

15. The method of claim 1, wherein communicating, to the second electronic device, the portion of the at least one electronic document comprises communicating to the second electronic device at least a portion of the at least one electronic document that is currently being displayed on the first electronic device.

16. The method of claim 1, further comprising communicating to the second electronic device one or more bookmarks that identify one or more positions within the portion of the at least one electronic document.

17. The method of claim 1, wherein the information restricting use of the portion of the at least one electronic document is based on a position of the first electronic device with respect to the position of the second electronic device.

18. The method of claim 17, wherein the information restricting use of the portion of the at least one electronic document comprises a predetermined time period for accessing the portion of the at least one electronic document.

19. The method of claim 1, further comprising receiving a referral credit from the electronic document provider based on the communication of the portion of the at least one electronic document to the second electronic device.

20. The method of claim 1,
comprising:
  determining a social network relation between a user identifier associated with the first electronic device and the user identifier associated with a second electronic device; and
  determining the portion of the electronic document for communication to the second electronic device based on the social network relation.

21. The method of claim 20, wherein the information restricting use of the portion of the electronic document is based on the social network relation.

22. The method of claim 21, wherein the information restricting use of the portion of the at least one electronic document comprises a predetermined time period that the second electronic device may access the at least one electronic document based on the social network relation.

23. The method of claim 1, wherein communicating, to the second electronic device, the portion of the at least one electronic document comprises communicating the entirety of the electronic document to the second electronic device.

24. An electronic device comprising:
an electronic document manager configured to:
  receive, from another electronic device, a request for at least one electronic document available for share;
  in response to the request, communicate, to the another electronic device, a list of electronic documents available for share;
  receive a selection of the at least one electronic document from the list of electronic documents available for share from the another electronic device;
  receive a user identifier associated with the another electronic device from the another electronic device;

verify a registration status of the user identifier associated with the another electronic device with at least one of a social network and an electronic document identifier; and a communications interface configured to communicate a portion of the at least one electronic document and information restricting use of the portion of the at least one electronic document to the another electronic device in response to verifying the registration status of the user identifier associated with the another electronic device.

25. A non-transitory computer-readable storage medium having stored thereon computer executable instructions for performing the following steps:

at a first electronic device:

receiving, from a second electronic device, a request for at least one electronic document available for share;

in response to the request, communicating, to the second electronic device, a list of electronic documents available for share;

receiving selection of the at least one electronic document from the list of electronic documents available for share;

receiving a user identifier associated with the second electronic device from the second electronic device;

verifying a registration status of the user identifier associated with the second electronic device with at least one of a social network and an electronic document provider; and in response to verifying the registration status of the user identifier associated with the second electronic device, communicating, to the second electronic device, a portion of the at least one electronic document and information restricting use of the portion of the at least one electronic document.

\* \* \* \* \*